(12) United States Patent
Nystrom et al.

(10) Patent No.: US 6,477,222 B1
(45) Date of Patent: Nov. 5, 2002

(54) GETTER FOR ATMOSPHERIC GASES IN OPTICAL SWITCH WORKING FLUID

(75) Inventors: Michael J. Nystrom, San Jose, CA (US); C. Girvin Harkins, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 67 days.

(21) Appl. No.: 09/846,928

(22) Filed: Apr. 30, 2001

(51) Int. Cl.$^7$ .................................................. G02B 6/26
(52) U.S. Cl. .............................. 378/16; 378/18; 378/19; 378/129
(58) Field of Search .............................. 385/14, 16, 17, 385/18, 19, 20, 21, 22, 23, 24, 129; 101/34

(56) References Cited

U.S. PATENT DOCUMENTS 6,195,478 B1 * 2/2001 Fouquet ........................ 385/17
6,320,994 B1 * 11/2001 Donald et al. ................. 385/16

OTHER PUBLICATIONS

Ware, Andrew, "New Photonic–Switching Technology for All–Optical Networks", Lightwave, Mar. 2000 (4 pages).
Israelsohn, Joshua, "Switching the Light Fantastic", EDN, Oct. 26, 2000, pp. 113–123.

* cited by examiner

Primary Examiner—Robert H. Kim
Assistant Examiner—Therese Barber

(57) ABSTRACT

An optical switch includes a core and a fluid reservoir. The core includes a base, a matrix controller substrate, and a planar lightwave circuit. The planar lightwave circuit has a plurality of waveguides and a plurality of trenches. Each trench is located at an intersection of two waveguides. The fluid reservoir supplies a fluid to the plurality of trenches of the core. The optical switch further includes a getter for removing atmospheric gases from the fluid. The getter may be a porous silica getter, a non-evaporable getter, or an evaporable getter. By removing atmospheric gases from the fluid, the getter improves the capacity and operation of the optical switch. The optical switch may further include a membrane to separate the getter in a getter chamber from the fluid in a fluid chamber.

20 Claims, 2 Drawing Sheets

GETTER FOR ATMOSPHERIC GASES IN OPTICAL SWITCH WORKING FLUID

FIELD OF THE INVENTION

The present invention relates to optical switches. More particularly, the present invention relates to getters for removing atmospheric gases from optical switches.

BACKGROUND OF THE INVENTION

One type of optical switch is based on inkjet printer technology and planar lightwave circuit technology. These optical switches route an optical stream from one path to another without having to convert the signal from optical, to electronic, and back to optical. Instead, these optical switches use bubbles, which are formed by vaporizing the fluid in the optical switch, to switch light signals from one optical fiber to another. The optical switches have a planar lightwave circuit, which includes a grid of intersecting paths or waveguides, mounted on a matrix controller substrate. At a cross point of two waveguides is a trench filled with fluid that has the same optical properties as the glass in the waveguides. As a result, light or an optical stream and its communications contents can travel unimpeded through the cross point.

When the optical signal needs to be rerouted, a bubble heater warms the appropriate trench to insert a vapor bubble at the cross point. The vapor bubble alters the optical properties of the cross point, thereby causing the light to be reflected along a different path. The bubbles can be formed and removed hundreds of times per second, providing a fast and reliable switching function, one without the use of mirrors or other mechanical moving parts.

One problem with this type of optical switch, however, is that atmospheric gases, such as oxygen, nitrogen, carbon dioxide, and water vapor, can seep into the optical switch and accumulate in the fluid. Because this optical switch uses vapor bubbles rather than air bubbles, a substantial accumulation of atmospheric gases can affect the performance of the optical switch. At present, these optical switches lack any sort of mechanism for removing unwanted atmospheric gases from the fluid.

Common metallic getter materials, such as zirconium-titanium alloys, have been used to purify inert gases. In inert gas purification applications, these metallic getters are typically heated to temperatures above 300° C. to improve their efficiency. The optical switches, however, operate a temperatures much lower than 300° C. and are adversely affected by the higher temperatures needed to activate metallic getters. Temperatures above 300° C. can damage the solder seals of the optical switch and cause the working fluid to degrade and react with the getter. In addition, metallic getters may not activate if they are in contact with a fluid, such as the working fluid of the optical switch. It would be desirable, however, to incorporate metallic getters into these optical switches, since at lower temperatures (e.g., less than 100° C.) metallic getters absorb or react with atmospheric gases, but not with more complex, inert compounds.

There is a need, therefore, for a getter that can be incorporated into an optical switch to remove accumulated atmospheric gases from the fluid in the optical switch over its operational life. In addition, it would be desirable for a getter to purify the fluid in a fill station prior to insertion of the fluid into the optical switch.

SUMMARY OF THE INVENTION

In accordance with one embodiment of the present invention, an optical switch includes a core and a fluid reservoir connected to the core. The core includes a base, a matrix controller substrate mounted on the base, and a planar lightwave circuit mounted on the matrix controller substrate. The planar lightwave circuit has a plurality of waveguides and a plurality of trenches. Each trench is located at a cross point or intersection of two waveguides. The fluid reservoir, which is coupled to the core via a tube, contains a fluid, which the fluid reservoir supplies to the plurality of trenches of the core. The optical switch further includes a getter for removing accumulated atmospheric gases from the fluid. The getter may be a porous silica getter, a non-evaporable getter, or an evaporable getter. The optical switch may further include a membrane that separates a getter chamber from a fluid chamber. The getter chamber and the fluid chamber may be located in the fluid reservoir. Alternatively, the getter chamber and the fluid chamber are separate containers that are coupled together by a connecting tube, with the membrane disposed in the connecting tube. The membrane may be a molecular sieve or a polymeric compound that allows atmospheric gases but not fluid, in either liquid or vapor form, to pass from the fluid chamber to the getter chamber.

In accordance with another embodiment of the present invention, a method of making an optical switch includes providing an optical switch having a core and a fluid reservoir coupled to the core via a tube and inserting a getter into the fluid reservoir. The optical switch has the features described above. The method further includes activating the getter in the fluid reservoir by connecting the fluid reservoir to a vacuum and heating the getter. The fluid reservoir is then filled with fluid from a fill station, and the fluid reservoir is sealed. The fluid reservoir may be divided by a membrane into a getter chamber, in which the getter is inserted, and a fluid chamber, which is filled with fluid from the fill station.

In accordance with still another embodiment of the present invention, a method of making an optical switch includes providing an optical switch having a core and a fluid reservoir coupled to the core via a supply tube, connecting the fluid reservoir of the optical switch via a supply tube to a fill station containing fluid, and inserting a getter into the fill station. The getter is activated in the fill station under a vacuum to purify the fluid in the fill station. The fluid is then supplied through the supply tube and into the fluid reservoir. The method further includes inserting a second getter into the fluid reservoir of the optical switch and activating the second getter prior to filling the reservoir with fluid from the fill station. The fluid reservoir may be divided, by a membrane that allows gas but not fluid to pass through, into a getter chamber containing the second getter and a fluid chamber.

BRIEF DESCRIPTION OF THE DRAWINGS

The present invention may be better understood, and its numerous objects, features, and advantages made apparent to those skilled in the art by referencing the accompanying drawings, wherein like reference numerals are used for like parts in the various drawings.

DETAILED DESCRIPTION

Figure 1:
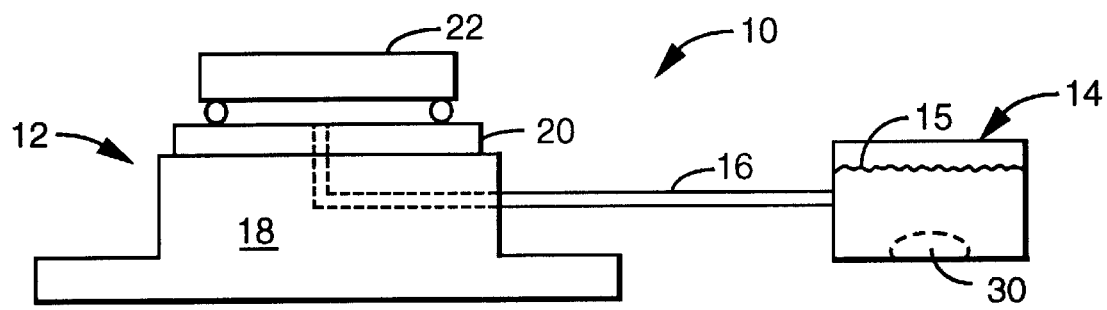
FIG. 1 is a schematic view of one embodiment of an optical switch including a core and a fluid reservoir.

Referring now to FIG. 1, an optical switch 10, in accordance with the present invention, includes a core 12 and a fluid reservoir 14. The fluid reservoir 14 is coupled to the core 12 via a tube 16 and supplies a working fluid 15 to the core 12 of the optical switch 10. The optical switch 10 is formed on a silicon chip using conventional microelectronic manufacturing techniques.

The core 12 of the optical switch 10 includes a base 18, a matrix controller substrate 20 and a planar lightwave circuit 22. The base 18 is made of molybdenum. Alternatively, the base 18 may be made of other suitable materials, such as tungsten, aluminum nitride, silicon carbide, and special thermally matched alloys. The matrix controller substrate 20 is a silicon chip that is mounted to the base 18 and includes a plurality of bubble heaters (not shown). The tube 16 extends from the fluid reservoir 14, through the base 18 and to the matrix controller substrate 20 to provide fluid to the core 12 of the optical switch 10. The planar lightwave circuit 22 is mounted on and sealed to the matrix controller substrate 20.

Figure 2:
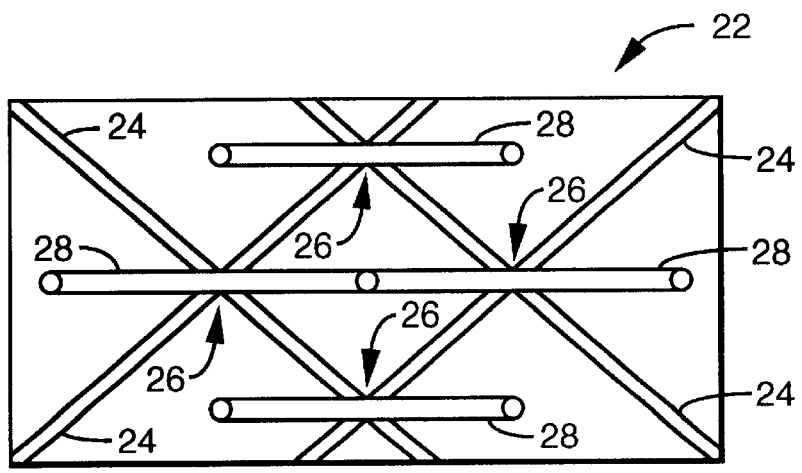
FIG. 2 is a partial plan view of the core of the optical switch, illustrating the waveguides and trenches formed in a planar lightwave circuit of the core.

As illustrated in FIG. 2, the planar lightwave circuit 22, which is made primarily of silicon dioxide, includes an array of permanently aligned waveguides 24. Each waveguide 24 is a glass channel that directs light down a defined optical path. The waveguides 24 intersect one another at various cross points 26 on the planar lightwave circuit 22.

The planar lightwave circuit 22 further includes a plurality of trenches 28 formed therein. Each trench 28 is located at a cross point 26 of two waveguides 24. The trenches 28 are filled with fluid that is supplied by the fluid reservoir 14 through the tube 16 to the planar lightwave circuit 22. The fluid in the trenches 28 has the same optical properties as the glass of the waveguides 24. Thus, light passing through a cross point 26 travels unimpeded through the fluid in the trench 28.

As discussed above, the matrix controller substrate 20, which is located beneath the planar lightwave circuit 22, includes a plurality of bubble heaters. Each bubble heater is associated with a corresponding trench 28. When the appropriate bubble heater is activated, the bubble heater heats the fluid in the appropriate trench 28 to vaporize the fluid and create a bubble in that trench 28. The presence of the bubble in the trench changes the refractive index of the trench, so that it differs from the refractive index of the glass in the waveguide 24. Accordingly, light, which in the absence of a bubble in the trench, would pass through the waveguide 26 unimpeded, is reflected, at a cross point 26, down a different waveguide.

The optical switch 10 is affected by atmospheric gases, which can seep into the optical switch 10 and accumulate in the fluid. Since the optical switch 10 uses vapor bubbles rather than air bubbles, the performance of the optical switch 10 can be adversely affected by the accumulation of atmospheric gases. Over time, accumulated atmospheric gases can cause the optical switch 10 to fail.

In order to prevent or significantly reduce the accumulation of atmospheric gases, the optical switch 10 of the present invention has a getter 30. The getter 30 may be located in the fluid reservoir 14. The getter 30 reacts with atmospheric gases in the fluid reservoir 14 to remove the unwanted atmospheric gases from the fluid.

The getter 30 can be a porous silica getter. Porous silica has an extremely high surface area, ranging between approximately 300 square meters per gram and 1000 square meters per gram. In the optical switch 10 of the present invention, the fluid reservoir 14 may contain between approximately 0.1 gram and 10 grams of porous silica. The amount of porous silica used in the optical switch depends on a number of factors, including the density and surface area of the porous silica, the activation temperature, the volume of fluid in the optical switch, and the assumed leak rate and life of the optical switch. Another advantage of using a porous silica getter is that porous silica can be used at temperatures much lower than 300° C. The getter properties of porous silica are activated by heating the porous silica in a vacuum to release the water vapor and atmospheric gases and then pumping away the water vapor and atmospheric gases. This will provide a clean surface of porous silica that is ready to react with any atmospheric gases in the optical switch 10.

Getter materials, other than porous silica, may also be used in the optical switch 10. The getter 30 may be a non-evaporable getter or an evaporable getter. Non-evaporable getters include alloys that are based primarily on zirconium or titanium-zirconium. Non-evaporable getters are also activated by an increase in temperature. When these alloys are heated, absorbed gases on the surface of the alloy diffuse into the bulk of the metal, leaving a clean outer surface that can react with any atmospheric gases. Evaporable getters, such as barium and titanium, undergo an exothermic reaction when heated, leaving a coating or residue of the evaporable getter material on the interior walls of the fluid reservoir 14. This coating will then react with any atmospheric gases inside the fluid reservoir 14. The optical switch 10 can include metallic getters, so long as the metallic getter is activated either outside of the optical switch 10 or away from the core 12 of the optical switch 10, such as in the fluid reservoir 14, and the metallic getter is activated prior to filling the fluid reservoir 14 with fluid. This ensures that the metallic getter will be properly activated without affecting the solder seals in the core 12 of the optical switch 10.

Figure 3:
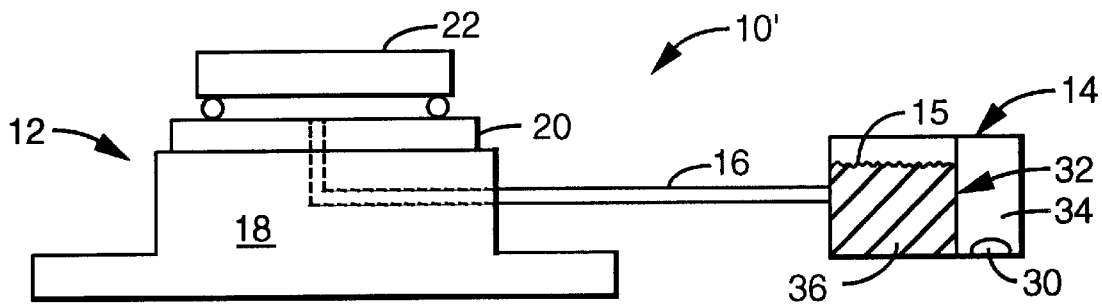
FIG. 3 is a schematic view of another embodiment of an optical switch having a core, a fluid reservoir, and a membrane disposed in the fluid reservoir.

FIG. 3 illustrates an optical switch 10' in accordance with another embodiment of the present invention. The optical switch 10' is similar to the optical switch 10, except that the optical switch 10' further includes a membrane 32 disposed in the fluid reservoir 14. The membrane 32 divides the fluid reservoir 14 into a getter chamber 34 and a fluid chamber 36. The getter 30 is located in the getter chamber 36, while the fluid 15 is contained in the fluid chamber 36. Alternatively, one of ordinary skill in the art will appreciate that the fluid reservoir and the getter chamber may be separate containers that are connected by a connecting tube, with the membrane located in the connecting tube.

The membrane 32 can be a molecular sieve, a porous solid that separates particles of molecular dimension. The molecular sieve is made of one or more synthetic zeolites, hydrated metal aluminosilicate compounds that have well-defined crystalline structures. Alternatively, other polymeric compounds may be used to form the membrane 32. The membrane 32 allows atmospheric gases, such as oxygen and nitrogen, to pass through the membrane 32 but prevents the fluid 15, in either liquid or vapor form, from entering the getter chamber 34. The membrane 32 improves the operation of the getter 30 by preventing the getter 30, particularly in the case of metallic getters, from contacting and reacting with the fluid 15. The membrane 34 in effect places the getter 30 external to the optical switch 10'. This is particularly useful for the non-evaporable and evaporable metallic getters, which may not activate, if they are in contact with the fluid. In addition, the membrane 32 prevents larger particles and other contaminants that result from the gettering process from being entrained in the fluid 15.

Figure 4:
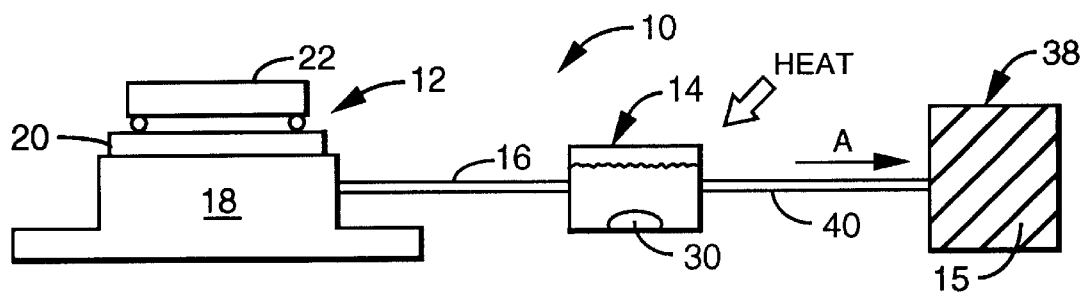
FIG. 4 is a schematic view showing the optical switch of FIG. 1 coupled to a fill station under a vacuum.
Figure 5:
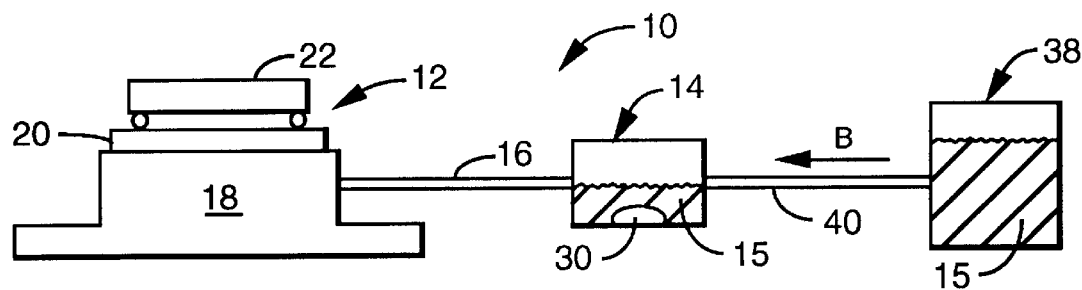
FIG. 5 is a schematic view showing the optical switch of FIG. 1 being filled with fluid from the fill station.
Figure 6:
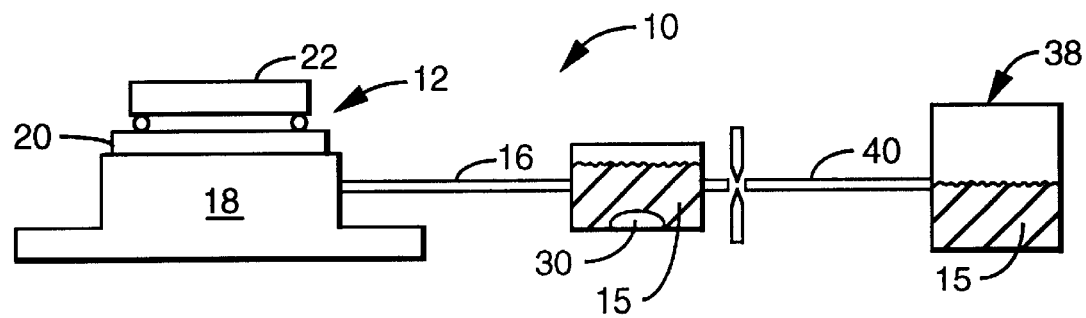
FIG. 6 is a schematic view showing the optical switch of FIG. 1 with a filled fluid reservoir being detached from the fill station.

FIGS. 4–6 illustrate one process of introducing the getter 30 into the optical switch 10. First, the optical switch 10 is manufactured using conventional microelectronic manufacturing techniques. Before the fluid reservoir 14 of the optical switch is filled with fluid, the getter 30 is placed in the fluid reservoir 14. As discussed above, the getter 30 may be include porous silica, a non-evaporable getter of a zirconium alloy, or an evaporable getter, such as a barium ring. The fluid reservoir 14 is then hooked up to a fill station 38 and a vacuum source (not shown). The fluid reservoir 14 is connected to the fill station 38 by a supply tube 40. Next, the fluid reservoir 14 is heated to activate the getter 30. An RF or microwave heat source may be used to heat the fluid reservoir 14. Alternatively, direct electrical resistance heating, laser heating or intense IR light may be used to heat either the getter 30 itself or the fluid reservoir 14 with the getter 30 contained therein. In the case of porous silica getters and evaporable getters, gases that are generated by the activation and/or evaporation process are pumped by the vacuum out of the fluid reservoir 14 in the direction indicated by the arrow A in FIG. 4. In the case of non-evaporable getters, the gases diffuse into the bulk of the getter alloy, leaving a clean outer surface.

Once the getter has been activated and the vacuum source has eliminated any unwanted gas from fluid reservoir 14, the vacuum is removed. Fluid 15 from the fill station 38 enters the fluid reservoir 14 via the supply tube 40 in the direction indicated by the arrow B in FIG. 5. When the fluid reservoir 14 is full, the optical switch 10 is separated from the fill station 38, and the tube 40 is pinched off and sealed (FIG. 6). The getter 30 remains in the fluid reservoir 14, working throughout the life of the optical switch 10 to remove atmospheric gases from the fluid 15 in the optical switch 10.

For evaporable getters, an alternative to installing a ring of the evaporable getter in the fluid reservoir 14, is to insert a probe with the getter material at one end into the fluid reservoir. After the getter has been activated and a coating or residue of the getter material is on the interior walls of the fluid reservoir 14, the probe is retracted. The fluid reservoir 14 is then filled and sealed, leaving only a film of the getter material on the inside of the fluid reservoir 14.

It is advantageous to activate the getter in fluid reservoir 14 prior to filling the fluid reservoir 14 with fluid. Placing the getter 30 in the fluid reservoir 14 keeps the getter 30 away from core 12 of the optical switch 10. Since only the fluid reservoir 14, or the getter 30 in the fluid reservoir 14, is heated during activation of the getter 30, the high activation temperature will not damage the solder seals in the core 12. In addition, since the fluid reservoir 14 is empty during getter activation, there is no fluid to adversely affect activation of the getter 30.

With respect to the optical switch 10' of FIG. 3, the getter 30 is inserted into the optical switch 10' and activated in a manner similar to that described above. The getter 30 is placed into the getter chamber 34, which is located on one side of the membrane 32 in the fluid reservoir 14, and the fluid 15 is supplied to the fluid chamber 36, which is located on the other side of the membrane 32.

The getter 30 improves the capacity and operation of the optical switches 10 and 10'. By removing atmospheric gases from the fluid, the getter 30 allows the optical switches to have a much higher leak rate than a comparable optical switches that lacks such a getter. The higher leak rate of these optical switches does not affect the operation of the optical switches during their design life.

The present invention further includes inserting a getter into the fill station 38, and activating the getter in the fill station 38 to purify the fluid 15 in the fill station 38, before the fluid 15 is supplied to the fluid reservoir 14. One of ordinary skill in the art will appreciate that the use of a getter to purify fluid in a fill station may be performed separate from or in conjunction with the introduction of an activated getter in the optical switch, as described above.

To purify the fluid in the fill station, a getter is inserted into the fill station. The optical switch 10 or 10' is connected to the fill station 38 via a larger supply tube. The fill station 32 is then heated to activate the getter. As the getter purifies the fluid in the fill station, a vacuum source coupled to the fill station 32 removes any unwanted gas. The purified fluid is then supplied to the fluid reservoir 14 via the larger supply tube.

The optical switch 10 or 10' can include a second getter that has been placed in the fluid reservoir 14 and activated in accordance with the method described above. Thus, the getter in the fill station purifies the fluid before it is supplied to the fluid reservoir 14 of the optical switch 10 or 10', while the second getter in the fluid reservoir 14 works during the life of the optical switch 10 or 10' to remove unwanted atmospheric gases from the fluid 14 in the optical switch 10 or 10'.

While particular embodiments of the present invention have been shown and described, it will be obvious to those of ordinary skill in the art that changes and modifications may be made without departing from this invention in its broader aspects. Thus, the appended claims are to encompass within their scope all such changes and modifications as fall within the true spirit and scope of this invention.

What is claimed is:

1. An optical switch comprising:
    a core including a base, a matrix controller substrate mounted on the base, and a planar lightwave circuit mounted on the matrix controller substrate, the planar lightwave circuit having a plurality of waveguides and a plurality of trenches, each trench being located at an intersection of two waveguides;
    a fluid reservoir containing a fluid and supplying the fluid via a tube to the plurality of trenches of the core; and
    a getter for removing atmospheric gases from the fluid.

2. The optical switch of claim 1, wherein the getter has a surface area of at least 300 square meters per gram.

3. The optical switch of claim 1, wherein the getter comprises porous silica.

4. The optical switch of claim 3, wherein the fluid reservoir includes at least 0.1 gram of porous silica.

5. The optical switch of claim 1, wherein the getter is non-evaporable.

6. The optical switch of claim 1, wherein the getter is evaporable, the evaporable getter coating an interior of the fluid reservoir.

7. The optical switch of claim 1, wherein the evaporable getter comprises barium.

8. The optical switch of claim 1, further comprising a membrane separating the fluid in a fluid chamber from the getter in a getter chamber, the membrane allowing atmospheric gases but not the fluid to pass from the fluid chamber into the getter chamber.

9. The optical switch of claim 8, wherein the fluid chamber and the getter chamber are located in the fluid reservoir.

10. A method of making an optical switch comprising:

providing an optical switch having a core and a fluid reservoir, the core including a base, a matrix controller substrate mounted on the base, and a planar lightwave circuit mounted on the matrix controller substrate, the planar lightwave circuit having a plurality of intersecting waveguides and a plurality of trenches, the fluid reservoir being coupled to the core via a tube;

inserting a getter into the fluid reservoir;

activating the getter in the fluid reservoir by connecting the fluid reservoir to a vacuum source and heating the getter;

supplying fluid from a fill station to the fluid reservoir via a supply tube; and sealing the fluid reservoir.

11. The method of claim 10, wherein the getter comprises porous silica, and wherein heating the getter causes absorbed gas to separate from the porous silica, the absorbed gas being extracted from the fluid reservoir by the vacuum source.

12. The method of claim 10, wherein the getter is non-evaporable, and wherein heating the getter causes absorbed gas to diffuse into a bulk of the getter, thereby providing the getter with a clean outer surface.

13. The method of claim 10, wherein the getter is evaporable, and wherein heating the getter causes an exothermic reaction, the reaction causing the getter to coat an interior surface of the fluid reservoir.

14. The method of claim 10, wherein the fluid reservoir of the optical switch includes a membrane dividing the fluid reservoir into a getter chamber and a fluid chamber, and wherein inserting the getter into the fluid reservoir includes inserting the getter into the getter chamber of the fluid reservoir.

15. A method of making an optical switch comprising:

providing an optical switch having a core and a fluid reservoir, the core including a base, a matrix controller substrate mounted on the base, and a planar lightwave circuit mounted on the matrix controller substrate, the planar lightwave circuit having a plurality of intersecting waveguides and a plurality of trenches, the fluid reservoir being coupled to the core via a tube;

connecting the fluid reservoir via a supply tube to a fill station, the fill station including fluid;

inserting a getter into the fill station;

activating the getter in the fill station under a vacuum; and supplying the fluid from the fill station through the supply tube and into the fluid reservoir.

16. The method of claim 15, further comprising purifying the fluid in the fill station prior to supplying the fluid to the fluid reservoir.

17. The method of claim 15, further comprising:

inserting a second getter into the fluid reservoir;

activating the second getter in the fluid reservoir; and sealing the fluid reservoir after fluid from the fill station has been supplied to the fluid reservoir.

18. The method of claim 17, wherein the second getter comprises porous silica.

19. The method of claim 17, wherein the second getter is non-evaporable, and wherein heating the getter causes absorbed gas to diffluse into a bulk of the getter, thereby providing the getter with a clean outer surface.

20. The method of claim 17, wherein the fluid reservoir of the optical switch includes a membrane dividing the fluid reservoir into a getter chamber and a fluid chamber, and wherein inserting the second getter into the fluid reservoir includes inserting the second getter into the getter chamber of the fluid reservoir.

* * * * *